(12) United States Patent
Chow

(10) Patent No.: US 11,044,616 B2
(45) Date of Patent: Jun. 22, 2021

(54) SELF-ORGANIZING NETWORK SWITCHING MATRIX

(71) Applicant: AT&T Mobility II LLC, Atlanta, GA (US)

(72) Inventor: Gary Edward Chow, Irvine, CA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 25 days.

(21) Appl. No.: 15/986,414

(22) Filed: May 22, 2018

(65) Prior Publication Data

US 2018/0270674 A1 Sep. 20, 2018

Related U.S. Application Data

(63) Continuation of application No. 15/166,446, filed on May 27, 2016, now Pat. No. 10,009,778, which is a
(Continued)

(51) Int. Cl.
*H04W 24/02* (2009.01)
*H04W 16/02* (2009.01)
(Continued)

(52) U.S. Cl.
CPC .......... *H04W 24/02* (2013.01); *H04W 16/00* (2013.01); *H04W 16/02* (2013.01); *H04W 84/18* (2013.01); *H04W 88/085* (2013.01)

(58) Field of Classification Search
CPC ..... H04W 24/02; H04W 84/18; H04W 16/00; H04W 16/02
See application file for complete search history.

(56) References Cited

U.S. PATENT DOCUMENTS 8,184,647 B2  5/2012 Gupta et al.
8,340,664 B2  12/2012 Tenny et al.
(Continued)

OTHER PUBLICATIONS

Foxcom, "Optical Distributed Antenna System (DAS): BTS Hotel Application Note." Foxcom Complete RF-2-Fiber Solutions, 2009, 4 pages.
(Continued)

*Primary Examiner* — Walli Z Butt
*Assistant Examiner* — Thad N Defauw
(74) *Attorney, Agent, or Firm* — Amin, Turocy & Watson, LLP

(57) ABSTRACT

A self-organizing network switching matrix is provided. The self-organizing network switching matrix can receive a first set of communications data from a set of base transceiver stations wherein the communications data includes a radio simulcast. It can send the first set of communications data to a subset of remote transceiver units in a set of remote transceiver units. A second set of communications data can be received from the first subset of remote transceiver units. A set of network activity data can be generated based on monitoring the receiving of the second set of communications data from the first subset of remote transceiver units for a defined network activity. The subset of remote transceiver units can be adjusted based on the network activity data. In this regard, the self-organizing network switching matrix facilitates automated capacity management providing just in time network dimensioning.

20 Claims, 11 Drawing Sheets

Related U.S. Application Data continuation of application No. 13/689,328, filed on Nov. 29, 2012, now Pat. No. 9,386,455.

(51) Int. Cl.
  *H04W 16/00* (2009.01)
  *H04W 84/18* (2009.01)
  *H04W 88/08* (2009.01)

(56) References Cited

U.S. PATENT DOCUMENTS

| | | | |
|---|---|---|---|
| 8,385,900 B2 | 2/2013 | Trigui | |
| 8,437,764 B2 | 5/2013 | Doettling et al. | |
| 8,498,207 B2 | 7/2013 | Trigui et al. | |
| 2001/0036163 A1 | 11/2001 | Sabat, Jr. et al. | |
| 2004/0156350 A1* | 8/2004 | Brasic | H04W 74/06 370/346 |
| 2005/0059437 A1* | 3/2005 | Son | H04W 52/0245 455/574 |
| 2006/0099987 A1 | 5/2006 | Singh et al. | |
| 2006/0221918 A1* | 10/2006 | Wang | H04W 4/02 370/338 |
| 2006/0258395 A1 | 11/2006 | Cave et al. | |
| 2009/0312022 A1 | 12/2009 | Viorel et al. | |
| 2010/0111013 A1 | 5/2010 | Chou | |
| 2010/0128676 A1* | 5/2010 | Wu | H04W 40/02 370/328 |
| 2010/0272218 A1 | 10/2010 | Yeh et al. | |
| 2011/0092220 A1 | 4/2011 | Bemini et al. | |
| 2011/0249558 A1 | 10/2011 | Raaf et al. | |
| 2011/0294527 A1 | 12/2011 | Brueck et al. | |
| 2011/0300871 A1* | 12/2011 | Dottling | H04W 24/02 455/446 |
| 2012/0136942 A1* | 5/2012 | Amidon | H04W 76/10 709/206 |
| 2012/0258732 A1 | 10/2012 | Jeong | |
| 2012/0307697 A1 | 12/2012 | Mukhopadhyay | |
| 2013/0028126 A1 | 1/2013 | Kazmi | |
| 2013/0095811 A1 | 4/2013 | Okino | |
| 2013/0095873 A1* | 4/2013 | Soriaga | H04B 7/024 455/509 |
| 2013/0170474 A1 | 7/2013 | Bi et al. | |
| 2013/0316710 A1 | 11/2013 | Maaref et al. | |
| 2014/0147125 A1 | 5/2014 | Chow | |

OTHER PUBLICATIONS

Foxcom, "Optical Distributed Antenna System (DAS): DAS Stadium Coverage Application Note." Foxcom Complete RF-2-Fiber Solutions, 2009, 8 pages.

William S. Hortos, "Cascaded neural networks for sequenced propagation estimation, multiuser detection, and adaptive radio resource control of third-generation wireless networks for multimedia services." SPIE Conference on Aoplications and Science of ComutationalIntelligence II, Orlando, Florida, Apr. 1999, pp. 261-275.

William S. Hortos, "Self-organizing feature maps for dynamic control of radio resources in CDMA microcellular networks." Aerospace/Defense Sensing and Controls, 1998, pp. 378-391.

Wunder et al "Self-Organizing Distributed Inter-Cell Beam Coordination in Cellular Networks with Best Effort Traffic." 2010 Proceedings of the 8th International Symposium on Modeling and Optimization in Mobile, Ad Hoc and Wireless Networks (WiOpt), 2010, pp. 295-302.

Blume, et al. "Energy Savings in Mobile Networks Based on Adaptation to Traffic Statistics." Bell Labs Technical Journal 15(2), 2010, pp. 77-94.

Non-Final Office Action dated Aug. 28, 2014 for U.S. Appl. No. 13/689,328, 47 pages.

Non-Final Office Action dated Oct. 22, 2014 for U.S. Appl. No. 14/041,532, 36 pages.

Final Office Action dated Nov. 18, 2014 for U.S. Appl. No. 13/689,328, 42 pages.

Non-Final Office Action dated Mar. 10, 2015 for U.S. Appl. No. 13/689,328, 50 pages.

Final Office Action dated Aug. 31, 2015 for U.S. Appl. No. 13/689,328, 52 pages.

Non-Final Office Action dated Nov. 4, 2015 for U.S. Appl. No. 14/792,120, 43 pages.

Non-Final Office Action dated Jul. 27, 2016 for U.S. Appl. No. 15/141,919, 36 pages.

Non-Final Office Action dated Jun. 9, 2017 for U.S. Appl. No. 15/166,446, 32 pages.

Office Action dated Oct. 13, 2017 for U.S. Appl. No. 15/166,446, 24 pages.

Office Action dated Sep. 19, 2017 for U.S. Appl. No. 15/476,916, 42 pages.

Non-Final Office Action received for U.S. Appl. No. 15/995,065 dated Mar. 21, 2019, 39 pages.

\* cited by examiner

SELF-ORGANIZING NETWORK SWITCHING MATRIX

CROSS-REFERENCE TO RELATED APPLICATIONS

This application is a continuation of, and claims priority to each of, U.S. patent application Ser. No. 15/166,446, entitled "SELF-ORGANIZING NETWORK SWITCHING MATRIX," filed May 27, 2016," which is a continuation of U.S. patent application Ser. No. 13/689,328 (now U.S. Pat. No. 9,386,455), entitled "SELF-ORGANIZING NETWORK SWITCHING MATRIX," filed Nov. 29, 2012," the entireties of which applications are hereby incorporated herein by reference.

TECHNICAL FIELD

The subject disclosure relates to wireless communications and, more particularly, to a self-organizing network switching matrix.

BACKGROUND

Communications systems, networks, and devices have seen an explosive growth in past few years and, in the future, are expected to see continuing growth with respect to applications, services, and/or functionality provided to a user. Along with the growth in portable electronic devices, and associated services, communications networks have similarly had to grow to meet the demand for the large amount of devices that connect to the network. For instance, within any city, sports venues such as stadiums or arenas, hotel ballrooms, and other similar areas can suffer from voice and data congestion on event days or other high traffic periods.

DETAILED DESCRIPTION

Figure 1:
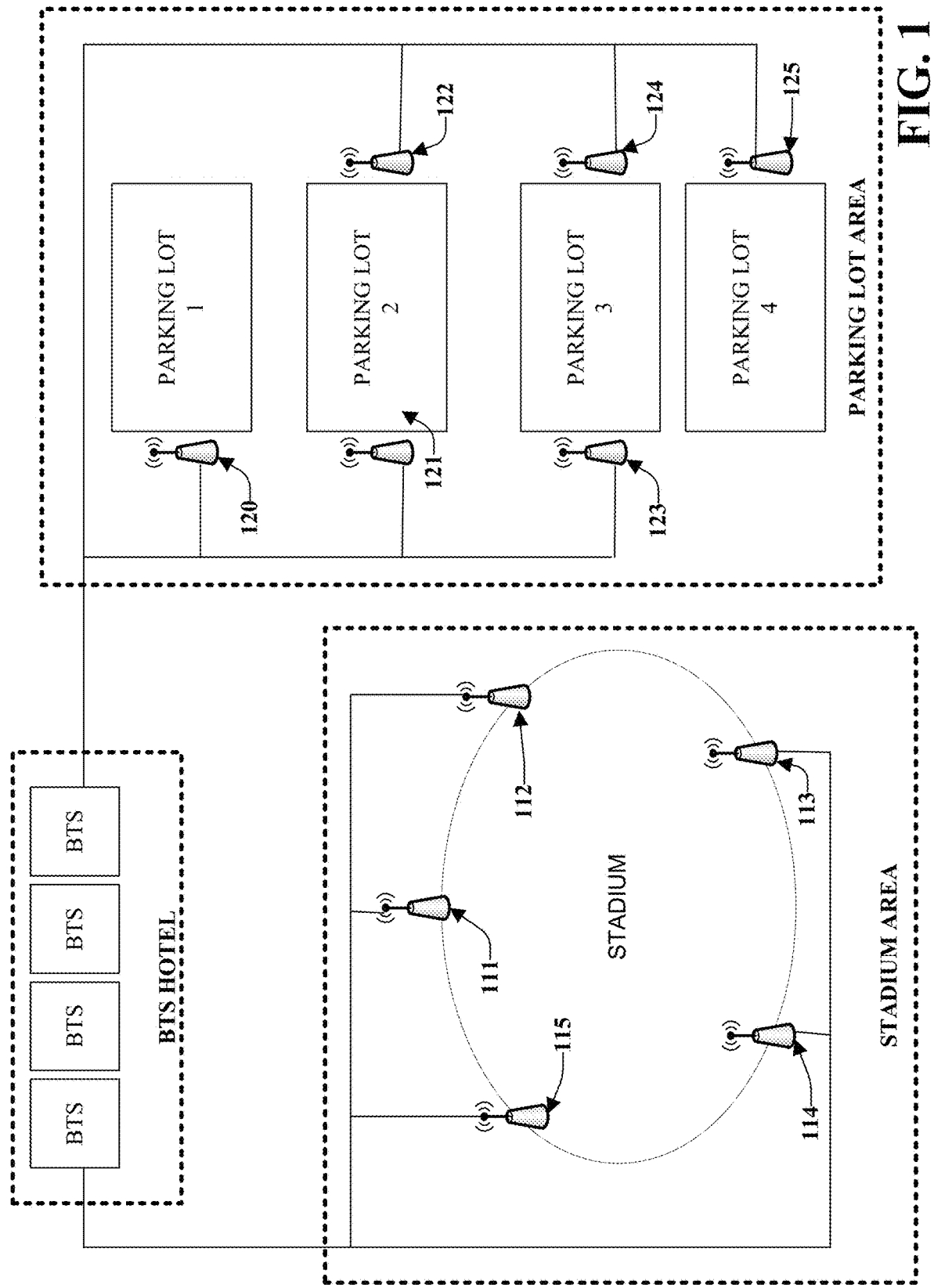
FIG. 1 illustrates an example site installation of a set of base transceiver stations and disparately placed remote transceiver units at stadium and neighboring parking lot.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Within any city, sports venues such as stadiums or arenas, hotel ballrooms, and other similar areas can suffer from voice and data congestion on event days or other high traffic periods. Currently, communication service providers attempt to mitigate such congestion by deploying a macro site or a distributed antenna system; however, these are dedicated fixed network assets at additional cost requiring the transport of equipment and installation. Often times, this fixed equipment will sit idle or underutilized if an event is not occurring or if it is outside the location's high traffic window. For example, deployed network assets at a football stadium can sit idle during the long offseason or during the week when a game is not occurring.

In addition to network assets sitting idle during times of lower demand, the same network assets may congest during high traffic periods because the deployed fixed network assets are insufficient to handle the amount of traffic generated when events are taking place. For example, some football stadiums can hold over a hundred thousand fans, where any number of those fans may wish to access network services at any one time using a smart phone, a tablet, a modem, etc. Currently, recourse is to design for the capacity demand and to overprovision to handle the peak traffic periods or to accept that congestion will occur during peak traffic periods, either way at corresponding increased cost related to the over provisioning.

Various embodiments of a self-organizing network switching matrix are provided, e.g., that allow a communications service provider to pool network resources at a centralized location and schedule network resources out to stadiums, hotel ballrooms, and other high traffic areas based on traffic conditions. By allocating network assets on demand, capacity can be scaled at a centralized location or multiple centralized locations to match the changing traffic demands. Using remotely located remote transceiver units, the self-organizing switching matrix can monitor traffic, and can adjust which remote transceiver units are active or dormant, by quickly splitting and de-splitting network resources to bring in additional capacity into an area when needed, and when traffic demand subsides, reallocating those resources elsewhere in the network. It is noted that the self-organizing network switching matrix facilitates automated capacity management providing just in time network dimensioning.

The self-organizing network switching matrix can exchange communications data with a set of base transceiver stations wherein the communications data includes a radio simulcast. The communications data can be exchanged with a first subset of remote transceiver units in a first set of remote transceiver units in a first location. A first set of network activity data can be generated based on monitoring the exchanging of communications data with the first subset of remote transceiver units for a defined network activity. Members of the first subset of remote transceiver units can be adjusted based on the first set of network activity data.

In an example implementation, communications data can be exchanged with a second subset of remote transceiver units in a second set of remote transceiver units in a second location. A second set of network activity data can be generated based on monitoring the exchanging of communications data with the second subset of remote transceiver units for a second defined network activity. Members of the second subset of remote transceiver units can be adjusted based on the second set of network activity data.

Referring now to FIG. 1, there is illustrated an example site installation of a set of base transceiver stations and disparately placed remote transceiver units at stadium and neighboring parking lot. The self-organizing network switching matrix facilitates automated capacity management by automatically sectorizing and de-sectorizing a venue space or other network area through the use of active and dormant remote transceiver unit deployed at venue locations and a centralized pool of base transceiver station equipment. An example stadium is depicted in FIG. 1, along with an associated parking lot area. The stadium area can be outfitted by remote transceiver units, shown in the figure as 111, 112, 113, 114, and 115 respectively. The parking lot area can similarly be outfitted by remote transceiver units, shown in the figure as 120, 121, 122, 123, 124, and 125 respectively. It is noted that although 5 and 6 remote transceiver units are depicted for each area, more or less can be used as capacity demands. The BTS hotel can include a set of base transceiver stations (BTS), which can be communicatively coupled with the remote transceiver units using, for example, an optic fiber connection. It is noted that other ways to communicatively couple disparately located BTS assets and remote transceiver units can also be used.

The self-organizing network switching matrix can be located at the BTS hotel, or in another location. The self-organizing network switching matrix can then control, in real time, which remote transceiver units are active, e.g., receiving a radio simulcast from a BTS among the BTS hotel, or dormant, e.g., inactive and not receiving a radio simulcast from a BTS among the BTS hotel. For example, prior to an event at the stadium, both the parking lot area and the stadium area can have little to no active remote transceiver units. Before the event, the self-organizing network switching matrix can determine increased demand in the parking lot, and increase the amount of active remote transceiver units in the parking lot area. Similarly, as people enter the stadium area, and demand for network services increases in the stadium area, additional remote transceiver units can be made active. When activity in the stadium area, or the parking lot area, change independent of one another, a ratio of active to dormant remote transceiver units can be adjusted to meet demand. It is noted that the self-organizing network switching matrix allows the communication provider to deploy their assets more efficiently by pooling and scheduling out their resources, from the BTS hotel, rather than having network assets sit idle for days or even months at a time. In addition, by pooling assets at a centralized location, costs can be saved, for example, on real estate ground leases needed to house network equipment.

Figure 2:
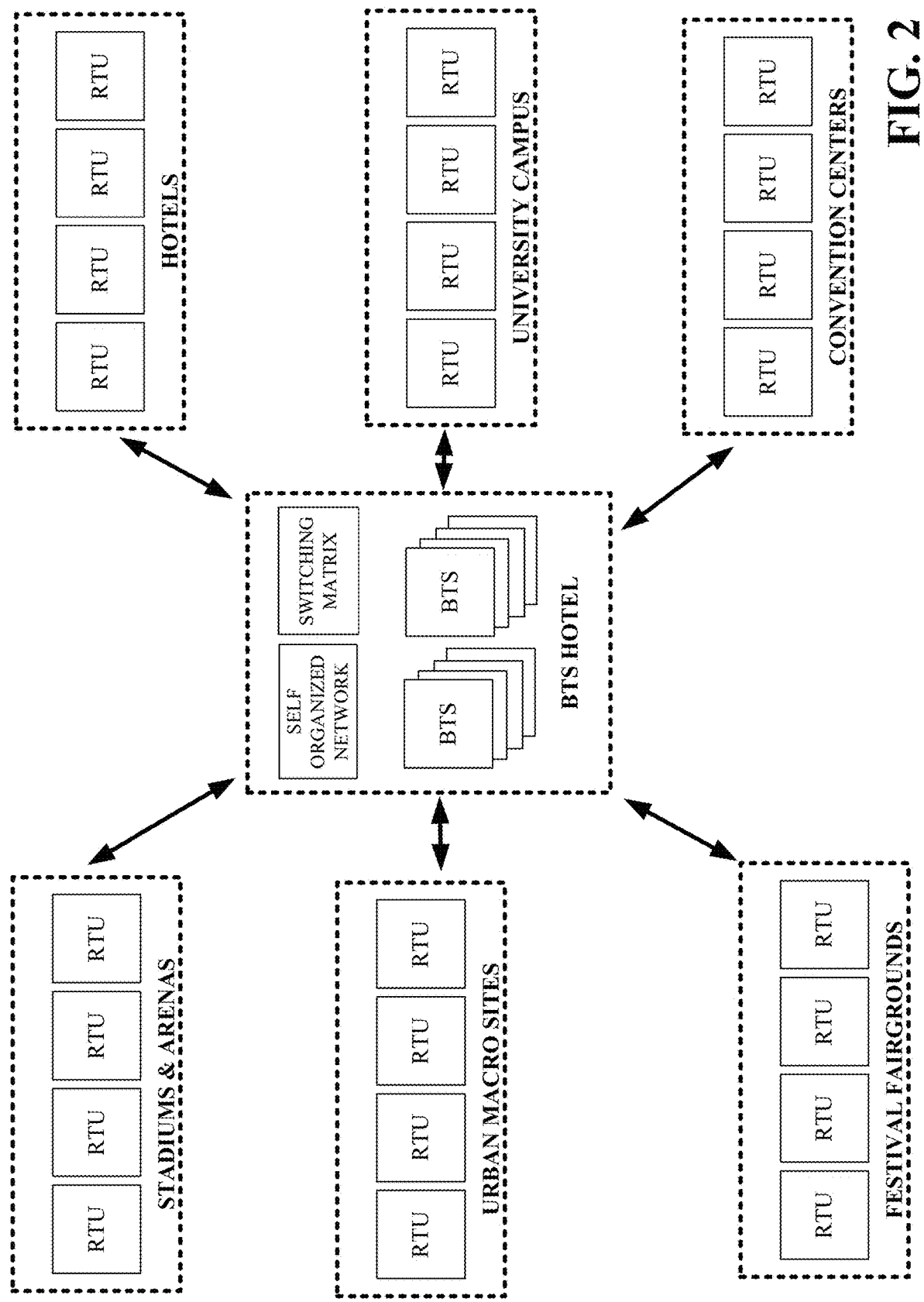
FIG. 2 illustrates an example network installation of a set of base transceiver stations and disparately placed remote transceiver units.

Referring now to FIG. 2, there is illustrated an example network installation of a set of base transceiver stations and disparately placed remote transceiver units. This example depicts a single BTS hotel along with the self-organizing switching matrix. The BTS hotel then can distribute its pooled resources to disparate locations of remote transceiver units. In this example, stadiums and arenas, hotels, large urban macro sites, festival fairgrounds, university campuses and convention centers can all share a centralized pool of resources. In this regard, areas with changing periods of high demand for network services and low demand for network services may be more efficiently served using the self-organizing network switching matrix.

Figure 3:
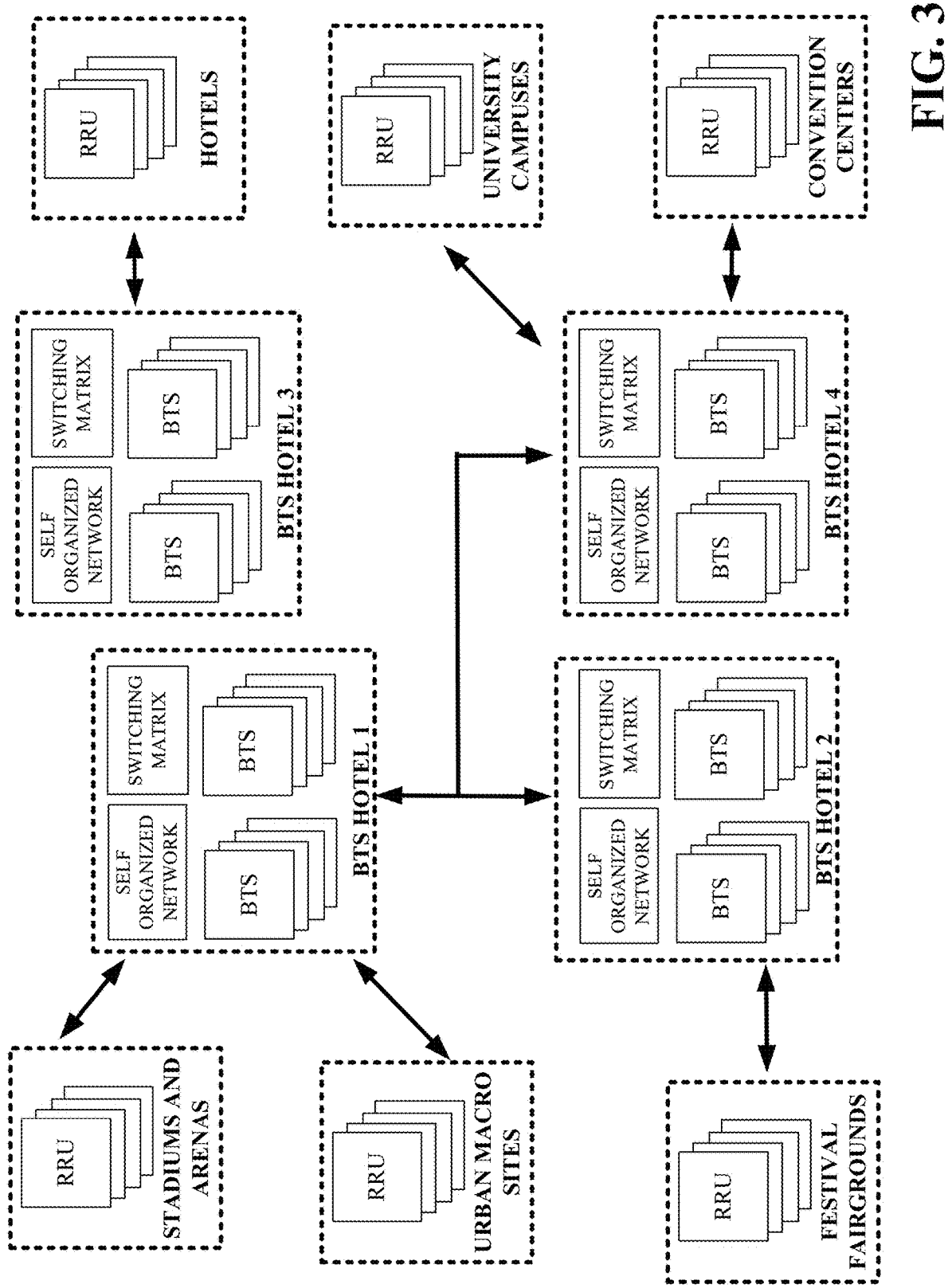
FIG. 3 illustrates an example network installation of multiple sets of base transceiver stations and disparately placed remote transceiver units.

Referring now to FIG. 3, there is illustrated an example network installation of multiple sets of base transceiver stations and disparately placed remote transceiver units. Similar to FIG. 2, similar locations can be served by BTS hotel locations including stadiums and arenas, hotels, large urban macro sites, festival fairgrounds, university campuses and convention centers. However, a single BTS hotel or a single centralized location does not have serve the entirety of network assets in a region. In FIG. 3, 4 separate BTS hotels are shown. BTS hotels can pool assets together, such as BTS hotels 1, 2, and 4 in the depicted example. In this scenario, for example, if BTS hotel 1 does not have the capacity to serve all active remote transceiver units at stadiums and arenas and urban macro site, BTS assets from BTS hotels 2 and 4 can be shared by BTS hotel. In another example, BTS hotel 3 can exist outside the shared pool of resources of BTS hotels 1, 2, and 4, and dedicate its resources to a singular location or multiple locations. It is noted that many different possible configurations are available for communication service providers to both maximize the efficient use of network resources while providing a positive experience to user equipment accessing those network resources.

Figure 4:
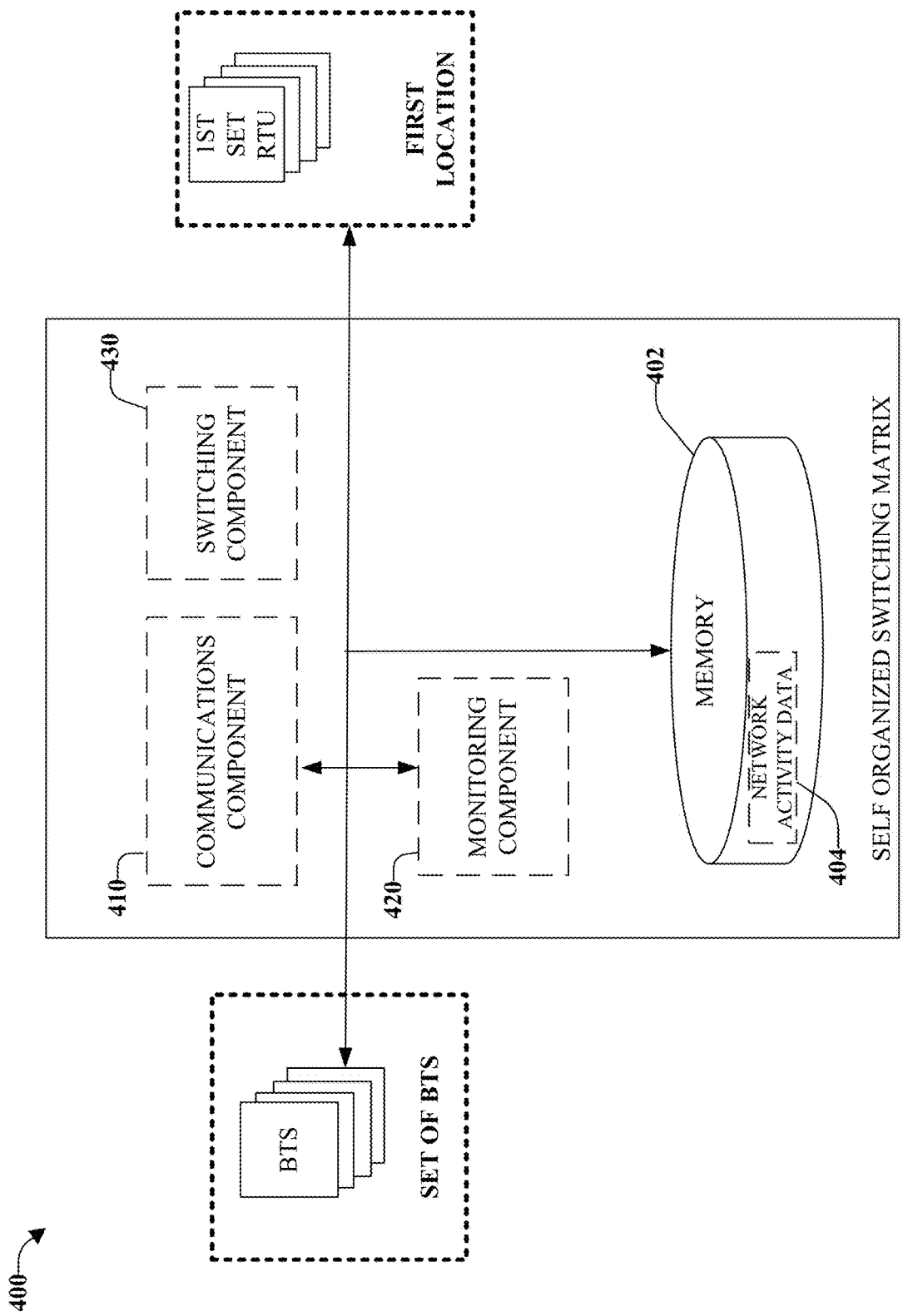
FIG. 4 illustrates an example self-organizing network switching matrix.

Referring now to FIG. 4, there is illustrated an example self-organizing network switching matrix. Self-organizing network switching matrix 400 includes a communications component 410, a monitoring component 420, a switching component 430, and a memory 404. Communications component 410 can exchange communications data with a set of base transceiver stations ("BTS") wherein the communications data includes a radio simulcast. Communications component 410 can further exchange the communications data with a first subset of remote transceiver units in a first set of remote transceiver units associated with a first location. It is noted that the radio simulcast can provide a network signal and route network resources necessary for a remote transceiver unit to provide communication services to a user equipment. In one implementation, self-organizing network switching matrix is in communication with the first set of remote transceiver units using an optic fiber connection.

A monitoring component 420 can generate a first set of network activity data based on monitoring the exchanging of communications data with the first subset of remote transceiver units for a defined network activity.

A switching component 430 can adjust the first subset of remote transceiver units based on the first set of network activity data. For example, the first subset of remote transceiver units that can exchange communication data with self-organizing network switching matrix can be deemed active. Those remote transceiver units within the first set of remote transceiver units but not within the first subset of remote transceiver units can be deemed dormant. It is noted that an active remote transceiver unit is capable of sending and receiving data with a user equipment. A dormant remote transceiver unit is incapable of sending and receiving data with a user equipment until changed to active status.

Figure 5:
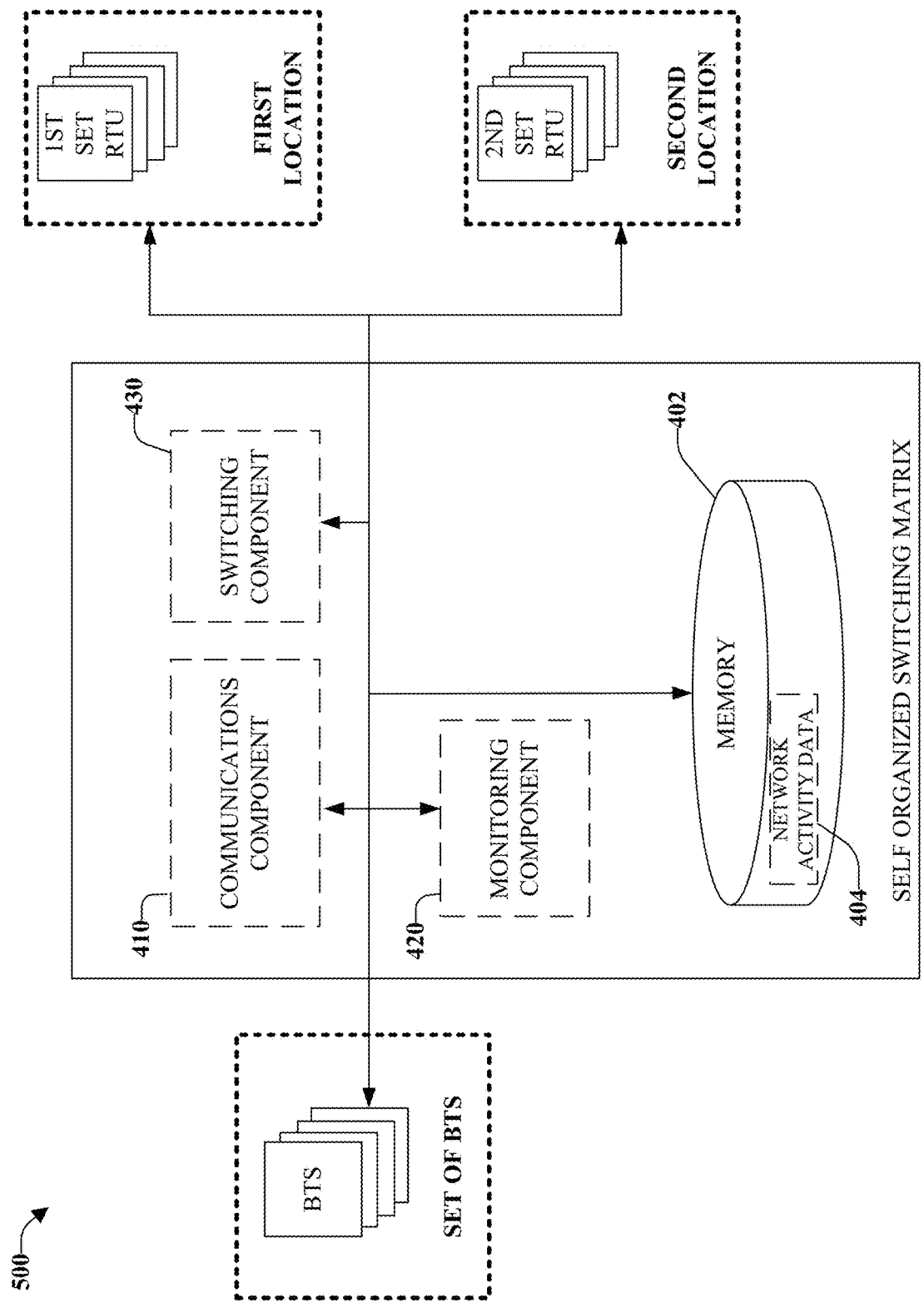
FIG. 5 illustrates an example self-organizing network switching matrix including a second location of remote transceiver units.

Referring now to FIG. 5, there is illustrated an example self-organizing network switching matrix including a second location of remote transceiver units. Communications component 410 can exchange the communications data with a second subset of remote transceiver units in a second set of remote transceiver units associated with a second location. In one implementation, the first location and the second location are geographically separated. In one implementation, self-organizing network switching matrix is in communication with the second set of remote transceiver units using an optic fiber connection.

In one implementation, the monitoring component 420 can further generate a second set of network activity data based on monitoring the exchanging of communications data with the second subset of remote transceiver units for a second defined network activity. Switching component 430 can further adjust the second subset of remote transceiver units based on the second set of network activity data.

Figure 6:
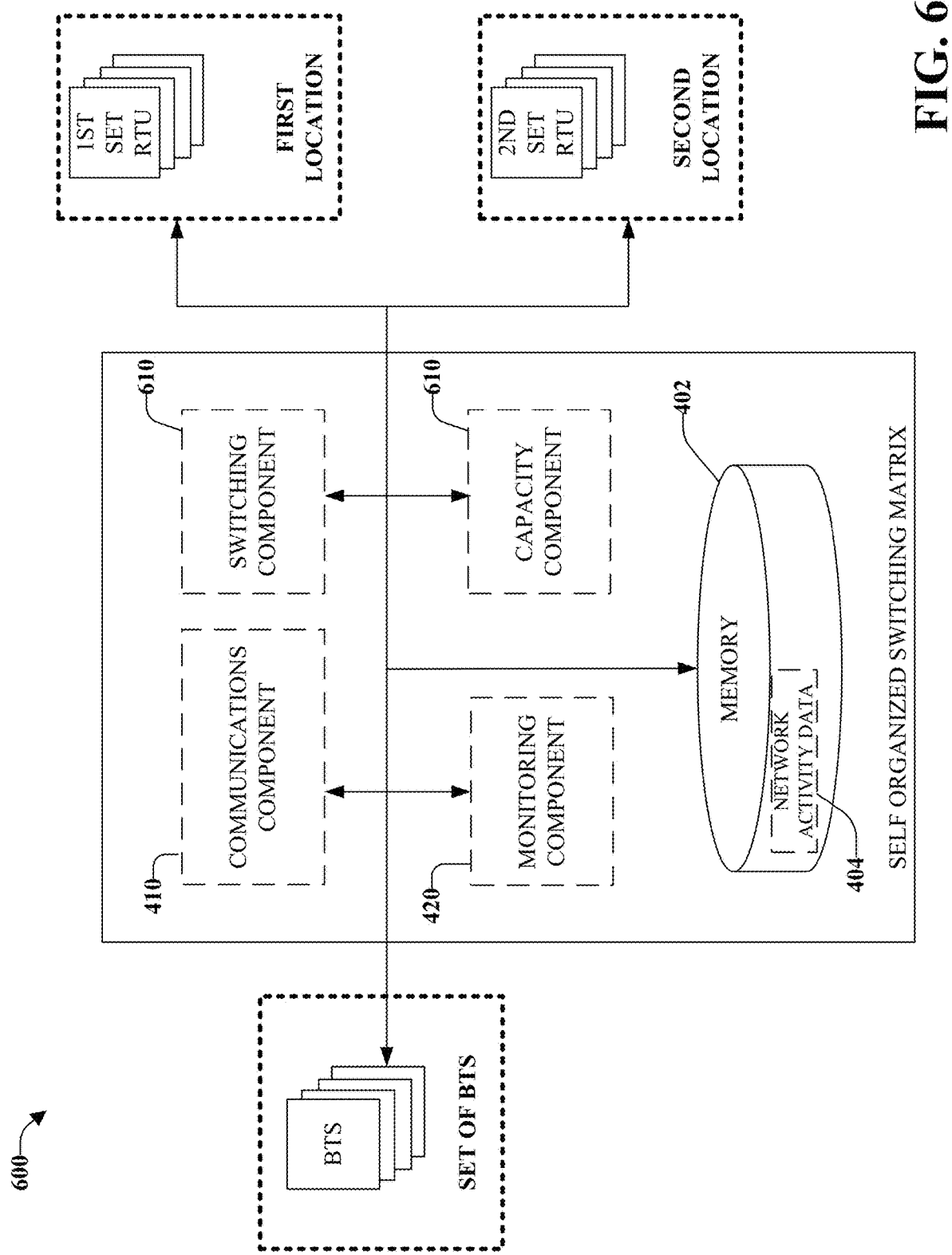
FIG. 6 illustrates an example self-organizing network switching matrix including a capacity component.

Referring now to FIG. 6, there is illustrated an example self-organizing network switching matrix including a capacity component. Capacity component can generate capacity data based on the first set of network activity data and the second set of network activity data. In one implementation, capacity data can include a capacity assessment related to at least one of the first set of remote transceiver units, the second set of remote transceiver units, or the set of base transceiver stations. For example, if the first set of remote transceiver units are all active, and the first set of network activity still indicates high traffic conditions, it could be indicative of need to add additional remote transceiver units to the first set of remote transceiver units. In another example, if the first set of remote transceiver units are not all active at any moment apparent in the first set of network activity data, it may be indicative that remote transceiver units could be removed from the first location without presenting service interruptions to users at that location. In yet another example, the first set of network activity and the second set of network activity may indicate that both the first and the second set require a large amount of active remote transceiver units at the same time. Continuing the example, this could indicate that the set of base transceiver stations don't have enough capacity to generate the radio simulcast to all active remote transceiver units in both the first location and the second location. It is noted that by generating a capacity assessment, network resources can be more efficiently allocated to provide service to user equipments while reducing costs for the service provider.

Figure 7:
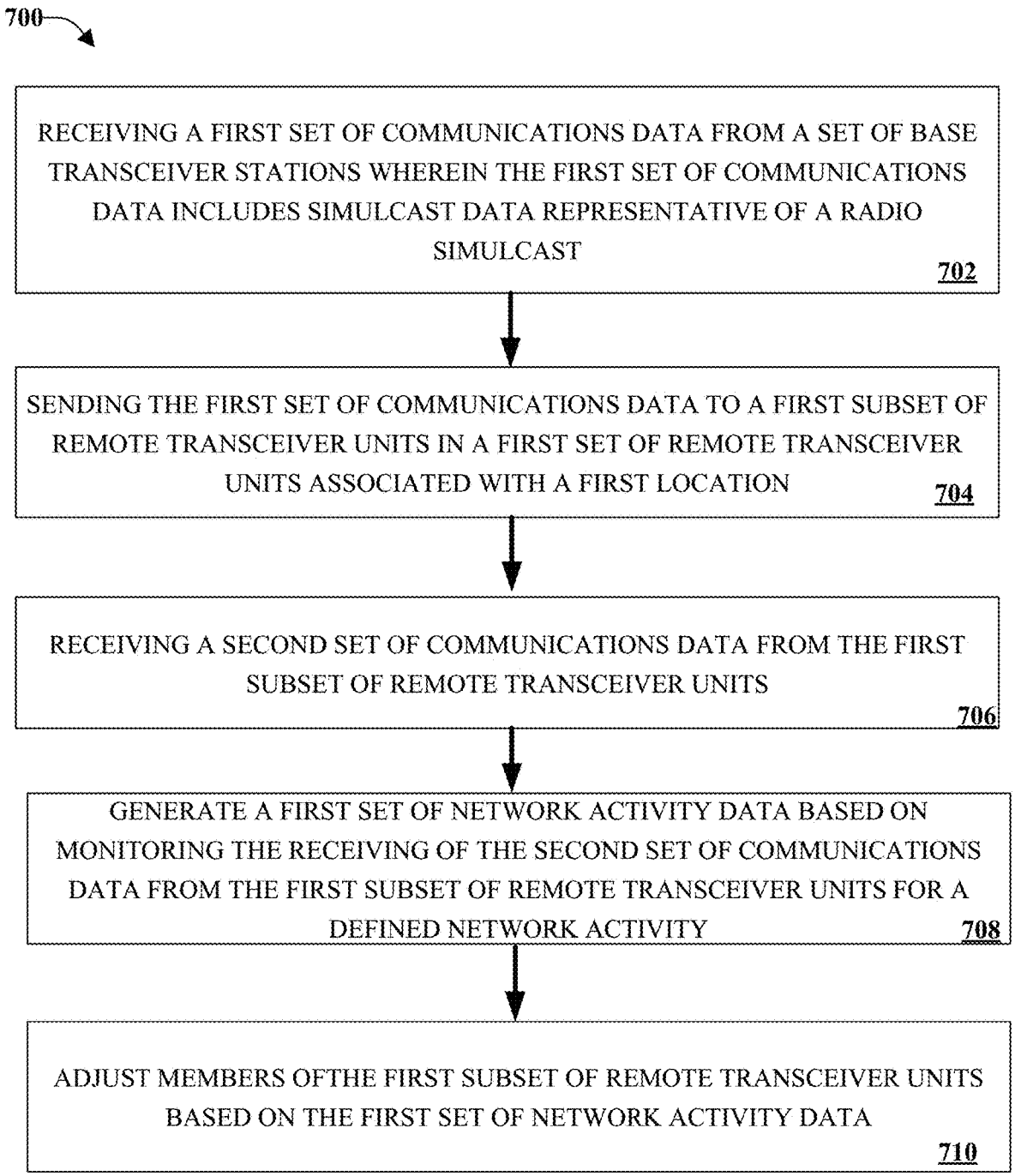
FIG. 7 illustrates an example method for administering a self organizing network switching matrix.
Figure 8:
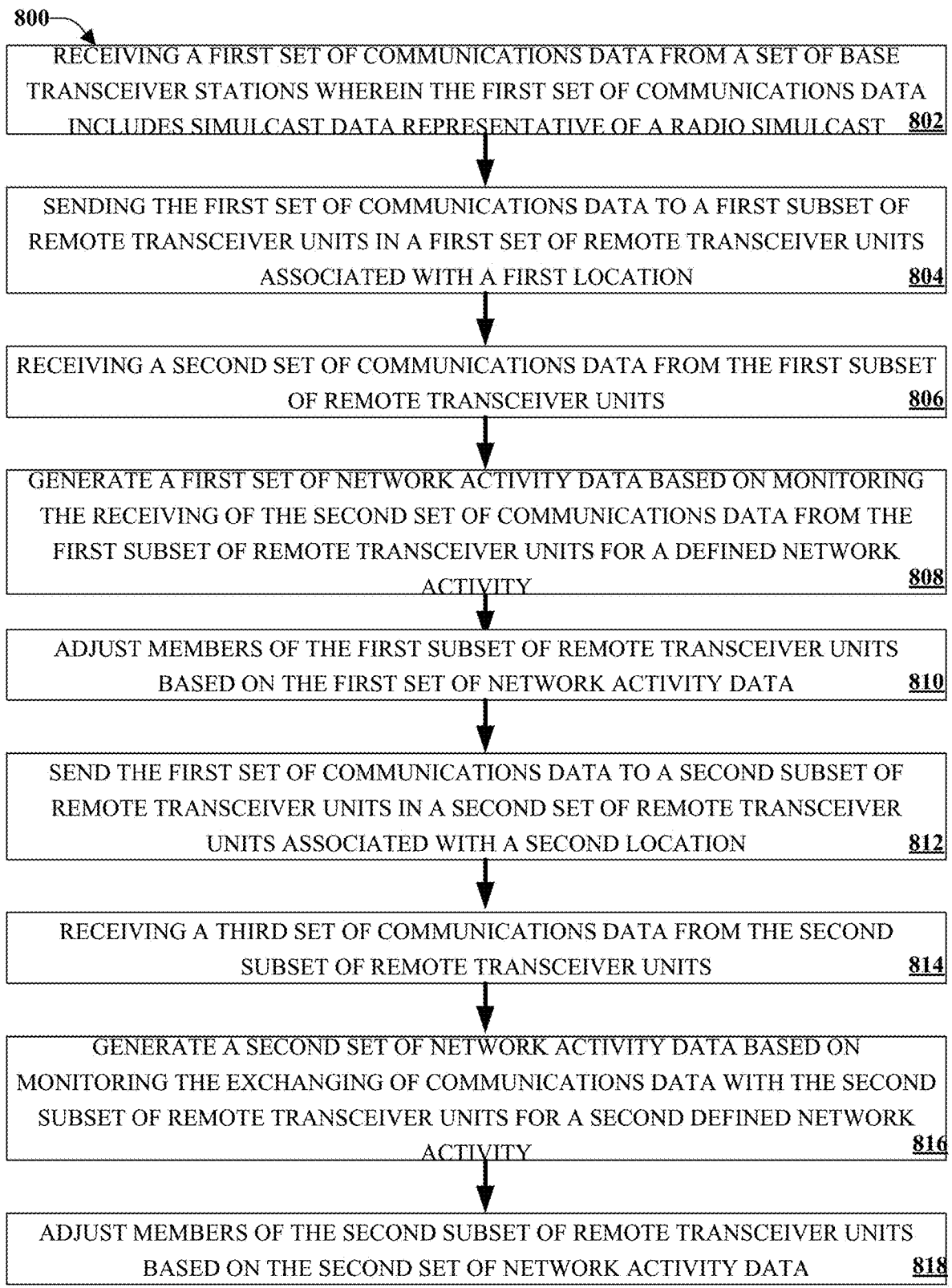
FIG. 8 illustrates an example method for administering a self organizing network switching matrix including a second location of remote transceiver units.
Figure 9:
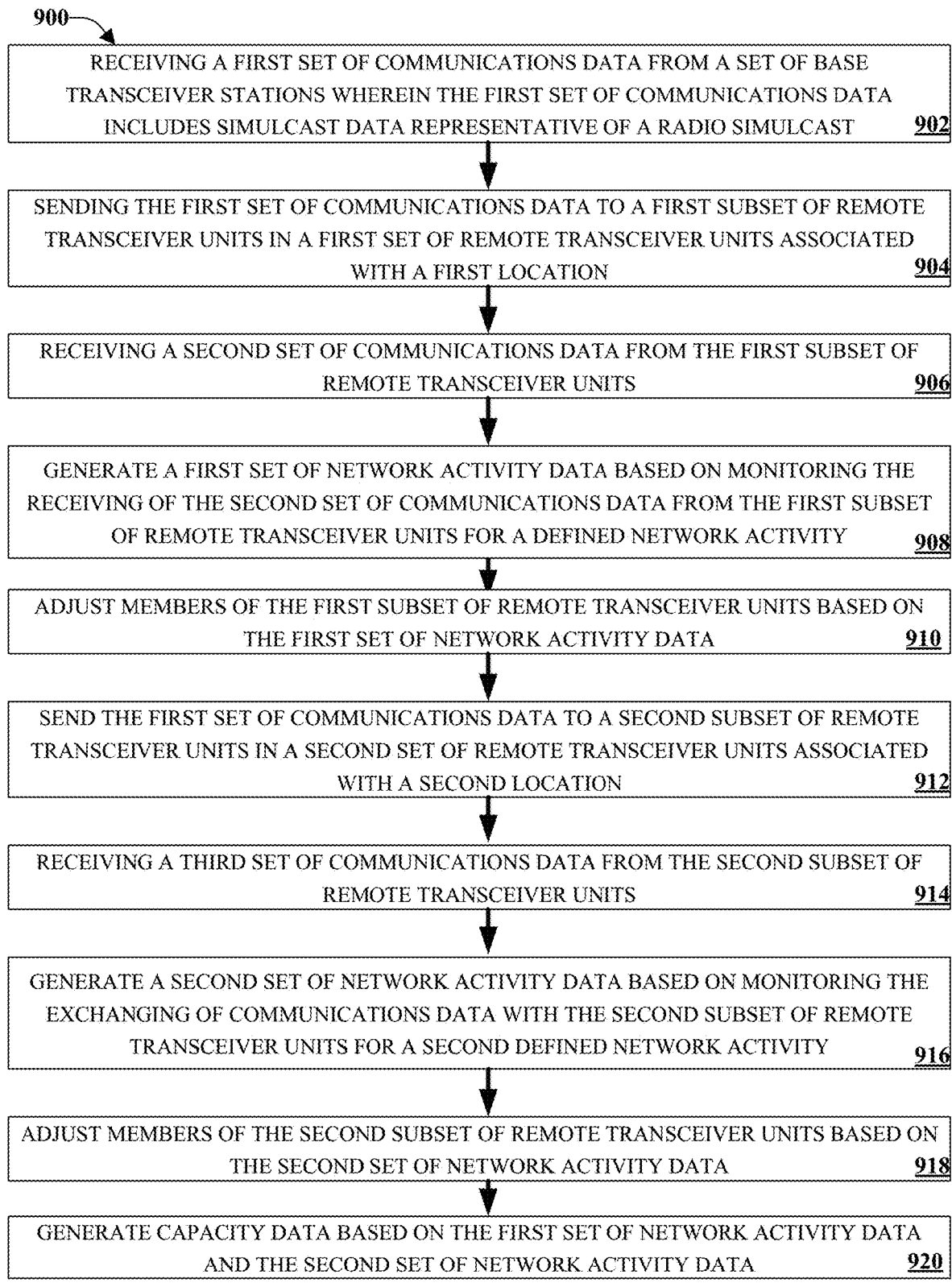
FIG. 9 illustrates an example method for administering a self organizing network switching matrix including generating capacity data.

FIGS. 7-9 illustrate methods and/or flow diagrams in accordance with this disclosure. For simplicity of explanation, the methods are depicted and described as a series of acts or operations. However, acts or operations in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring now to FIG. 7, there is illustrated an example method for administering a self-organizing network switching matrix. At 702, a first set of communications data can be received from a set of base transceiver stations wherein the first set of communications data includes a radio simulcast. At 704, the first set of communications data can be sent to a first subset of remote transceiver units in a first set of remote transceiver units associated with a first location. At 706, a second set of communications data can be received from the first subset of remote transceiver units. At 708, a first set of network activity data can be generated based on monitoring the receiving of the second set of communications data from the first subset of remote transceiver units for a defined network activity. At 710, members of the first subset of remote transceiver units can be adjusted based on the first set of network activity data.

Referring now to FIG. 8, there is illustrated an example method for administering a self-organizing network switching matrix including a second location of remote transceiver units. At 802, a first set of communications data can be received from a set of base transceiver stations wherein the first set of communications data includes a radio simulcast. At 804, the first set of communications data can be sent to a first subset of remote transceiver units in a first set of remote transceiver units associated with a first location. At 806, a second set of communications data can be received from the first subset of remote transceiver units. At 808, a first set of network activity data can be generated based on monitoring the receiving of the second set of communications data from the first subset of remote transceiver units for a defined network activity. At 810, the first subset of remote transceiver units can be adjusted based on the first set of network activity data.

At 812, the first set of communications data can be sent to a second subset of remote transceiver units in a second set of remote transceiver units associated with a second location. At 814, a third set of communications data can be received from the second subset of remote transceiver units. At 816, a second set of network activity data can be generated based on monitoring the receiving of the third set of communications data from the second subset of remote transceiver units for a second defined network activity. At 818, members of the second subset of remote transceiver units can be adjusted based on the second set of network activity data.

Referring now to FIG. 9, there is illustrated an example method for administering a self-organizing network switching matrix including generating capacity data. At 902, a first set of communications data can be received from a set of base transceiver stations wherein the first set of communications data includes a radio simulcast. At 904, the first set of communications data can be sent to a first subset of remote transceiver units in a first set of remote transceiver units associated with a first location. At 906, a second set of communications data can be received from the first subset of remote transceiver units. At 908, a first set of network activity data can be generated based on monitoring the receiving of the second set of communications data from the first subset of remote transceiver units for a defined network activity. At 910, the first subset of remote transceiver units can be adjusted based on the first set of network activity data.

At 912, the first set of communications data can be sent to a second subset of remote transceiver units in a second set of remote transceiver units associated with a second location. At 914, a third set of communications data can be received from the second subset of remote transceiver units. At 916, a second set of network activity data can be generated based on monitoring the receiving of the third set of communications data from the second subset of remote transceiver units for a second defined network activity. At 918, the second subset of remote transceiver units can be adjusted based on the second set of network activity data. At 920, capacity data can be generated based on the first set of network activity data and the second set of network activity data.

Figure 10:
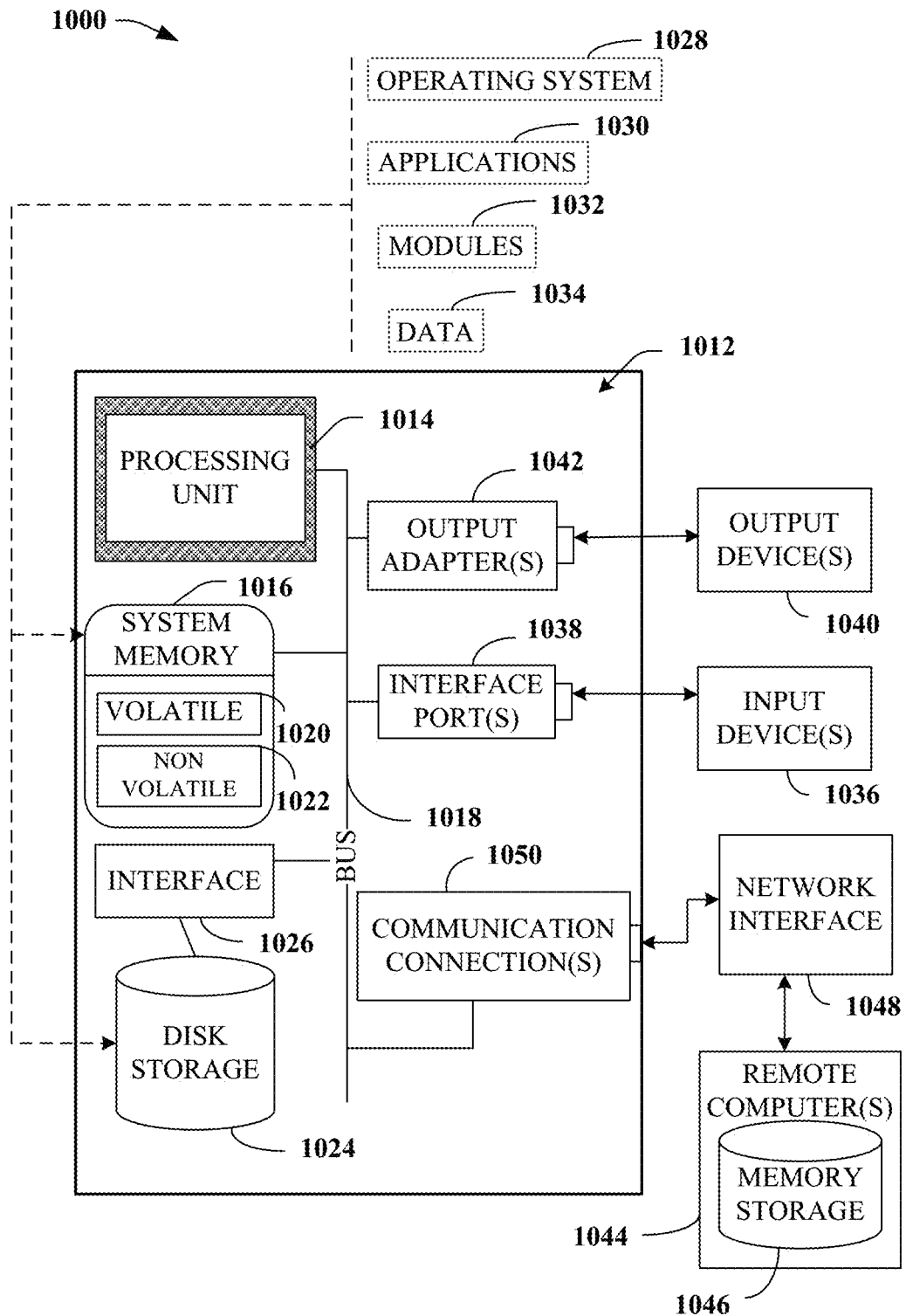
FIG. 10 illustrates a block diagram of a computer operable to execute the disclosed communication architecture.

Turning now to FIG. 10 there illustrated is a block diagram of a computing system 1000 operable to execute the disclosed systems and methods in accordance with an embodiment. Computer 1012 (which can be, for example, part of the hardware of a component includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 11124), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/nonvolatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1011 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

Figure 11:
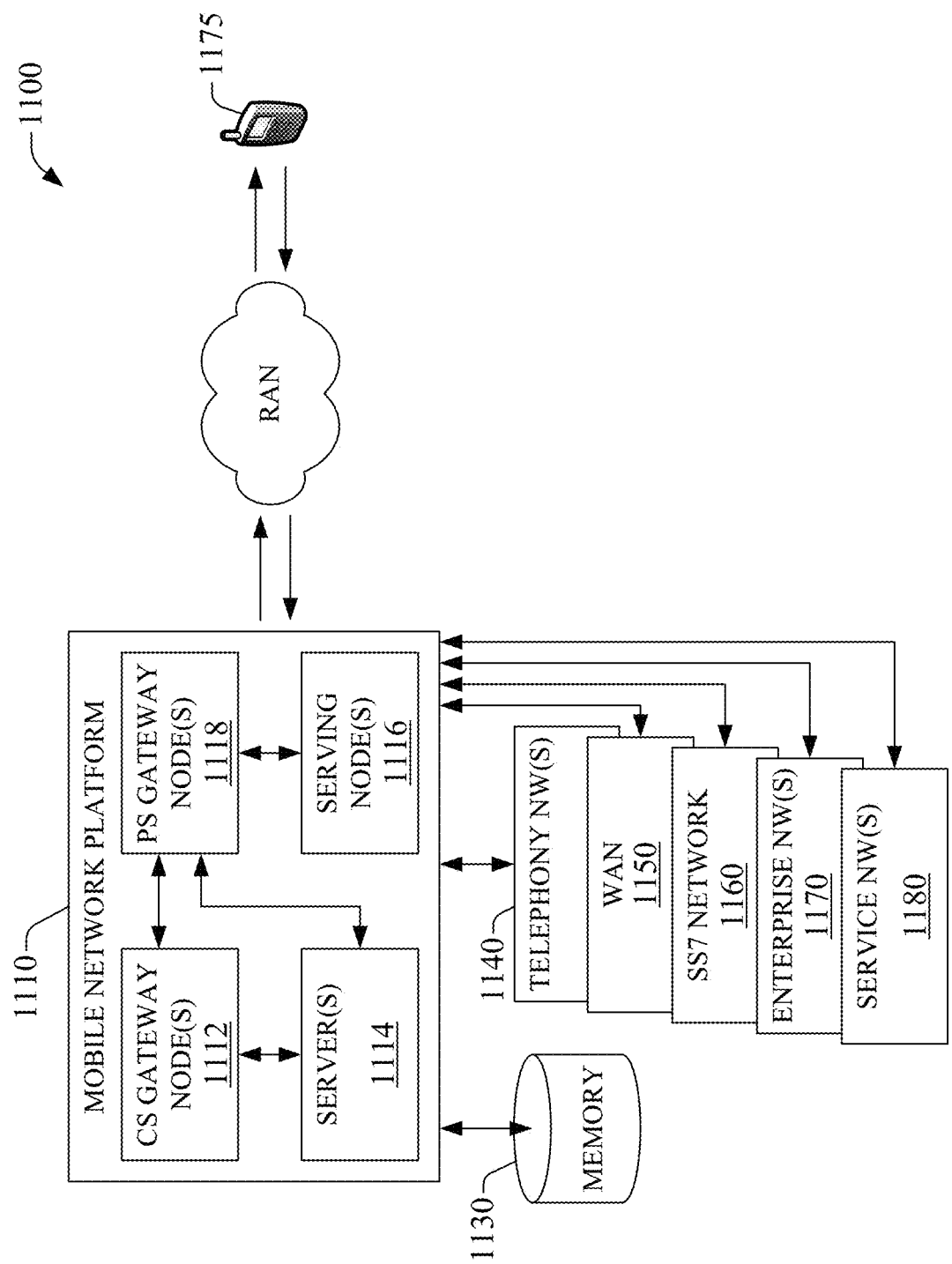
FIG. 11 is a block diagram of an example embodiment of a mobile network platform to implement and exploit various features or aspects of the subject disclosure.

Now turning to FIG. 11, such figure presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

As used in this application, the terms "component," "module," "system," "interface," "service," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Likewise, the terms "access point," "base station," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "data flow," "data session," and the like are also employed interchangeably throughout the subject specification, unless context warrants particular distinction(s) among the terms.

Aspects or features of the subject innovation can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the subject innovation can be exploited in legacy telecommunication technologies.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    monitoring, by network equipment comprising a processor, network traffic associated with a first active remote transceiver of first active remote transceivers;
    based on an indication that the first active remote transceiver is experiencing an increase in the network traffic associated with a servicing capacity, generating, by the network equipment, first network activity data related to a defined network activity and associated with the network traffic;
    based on the indication, increasing, by the network equipment, the first active remote transceivers from a first number of the first active remote transceivers to a second number of first active remote transceivers that is different from the first number of the first active remote transceivers;
    in response to generating the first network activity data, facilitating, by the network equipment, transmitting communication data to a second active remote transceiver, of second active remote transceivers, after the first network activity data has been determined to have been generated by the network equipment;
    modifying, by the network equipment, a status of inactive remote transceivers from inactive to active to increase a number of the second active remote transceivers from a first number of second active remote transceivers to a second number of second active remote transceivers that is different from the first number of second active remote transceivers, wherein the first active remote transceiver and the inactive remote transceivers are of a same set of remote transceivers;
    in response to the modifying, pooling, by the network equipment, network assets associated with the first active remote transceiver and the second number of active remote transceivers of the second active remote transceivers; and
    in response to the pooling of the network assets, generating, by the network equipment, capacity data based on the first network activity data and second network activity data associated with the second number of active remote transceivers.

2. The method of claim 1, further comprising:
    in response to pooling the network assets, adjusting, by the network equipment, a status of the second active remote transceiver.

3. The method of claim 1, wherein pooling the network assets comprises splitting the network assets between the first active remote transceiver and the second active remote transceiver.

4. The method of claim 2, wherein the adjusting comprises adjusting the status of the second active remote transceiver to an active status.

5. The method of claim 3, wherein the indication is a first indication, and further comprising:
    in response to receiving a second indication, undoing, by the network equipment, the splitting of the network assets between the first active remote transceiver and the second active remote transceiver.

6. The method of claim 4, further comprising:
    in response to receiving a second indication that the first remote transceiver is no longer at the servicing capacity, reallocating, by the network equipment, assets of the network assets associated with the second active remote transceiver.

7. The method of claim 5, wherein the second indication indicates that the first active remote transceiver is no longer at a threshold associated with the servicing capacity.

8. The method of claim 6, wherein reallocating the network assets comprises reallocating the network assets to a third active remote transceiver of the second active remote transceivers.

9. A system, comprising:
a processor; and
a memory that stores executable instructions that, when executed by the processor, facilitate performance of operations, comprising:
receiving data related to a first network activity associated with an increase in network traffic conditions, wherein the first network activity is a defined network activity;
in response to the receiving the data, determining a number of active remote transceivers to mitigate the increase in the network traffic conditions, and generating first network activity data associated with the network traffic conditions;
in response to the generating, transmitting communication data to a first active remote transceiver of the active remote transceivers;
based on the number of active remote transceivers and a switching matrix, increasing the number of active remote transceivers by modifying a status of inactive remote transceivers from an inactive status to an active status to increase the number of active remote transceivers from a first number of active remote transceivers to a second number of active remote transceivers that is greater than the first number of active remote transceivers, to facilitate combining network resources associated with the first number of the active remote transceivers and the second number of active remote transceivers, wherein the first active remote transceiver and the inactive remote transceivers are of a same group of remote transceivers;
in response to modifying the status of the inactive remote transceivers transmitting the network first activity data to a second active remote transceiver, of the second number of active remote transceivers; and
in response to pooling of the network resources of the second active remote transceiver, generating, capacity data based on the first network activity and second network activity associated with the second active remote transceiver.

10. The system of claim 9, wherein the operations further comprise:
distributing the network resources to mitigate the increase in the network traffic conditions.

11. The system of claim 9, wherein the operations further comprise:
receiving an indication that the first active remote transceiver, of the active remote transceivers is experiencing the increase in the network traffic conditions.

12. The system of claim 9, wherein the operations further comprise:
in response to determining the increased number of remote transceivers, determining a base transceiver station device to facilitate the combining of the network resources.

13. The system of claim 11, wherein the operations further comprise:
apportioning the network resources between the first active remote transceiver and the second active remote transceiver in accordance with a resource limit of the first active remote transceiver.

14. The system of claim 13, wherein the operations further comprise:
in response to apportioning the network resources between the first active remote transceiver and the second active remote transceiver, adjusting a status associated with the second active remote transceiver.

15. The system of claim 13, wherein the indication is a first indication, and wherein the operations further comprise:
in response to receiving a second indication that a first base transceiver station device is unable to service the second active remote transceiver, determining a second base transceiver station device to service the second active remote transceiver.

16. A non-transitory machine-readable medium, comprising executable instructions that, when executed by a processor, facilitate performance of operations, comprising:
determining that a first active remote transceiver device of active remote transceiver devices has experienced an increase in network traffic associated with a servicing capacity;
based on the determining, increasing, via a switching matrix, the active remote transceiver devices from a first number of active remote transceiver devices to a second number of active remote transceiver devices different than the first number of active remote transceiver devices, wherein increasing the active remote transceiver devices comprises modifying a status of inactive remote transceiver devices from an inactive status to an active status to increase a number of active remote transceiver devices, and wherein the first active remote transceiver device and the inactive remote transceiver devices are of a same group of devices;
based on the determining, generating first network activity data related to a defined network activity and associated with the network traffic;
in response to the generating,
transmitting communication data to a second active remote transceiver device, that was previously inactive, of the second number of active remote transceiver devices after the first network activity data has been determined to have been transmitted to the first number of active remote transceiver devices, and
pooling network resources associated with the first active remote transceiver device and the second active remote transceiver device; and
in response to pooling the network resources, generating capacity data based on the first network activity data and second network activity data associated with the second active remote transceiver.

17. The non-transitory machine-readable medium of claim 16, wherein the operations further comprise:
in response to pooling the network resources, adjusting a status of the second active remote transceiver device, and wherein adjusting the status of the second active remote transceiver device comprises adjusting the status of the second active remote transceiver device to an active status.

18. The non-transitory machine-readable medium of claim 17, wherein the operations further comprise:
in response to pooling the network resources, receiving an indication that the network resources are no longer being requested.

19. The non-transitory machine-readable medium of claim 18, wherein the operations further comprise:
based on receiving the indication that the network resources are no longer being requested, de-splitting, by the first active remote transceiver device, the network resources from the second active remote transceiver device.

20. The non-transitory machine-readable medium of claim 19, wherein the operations further comprise:

in response to de-splitting the network resources from the second active remote transceiver device, adjusting the status of the second active remote transceiver device, and wherein adjusting the status of the second active remote transceiver device comprises adjusting the status of the second active remote transceiver device to a dormant status.

\* \* \* \* \*